United States Patent
Kweon et al.

(10) Patent No.: US 6,610,364 B1
(45) Date of Patent: Aug. 26, 2003

(54) APPARATUS FOR DISPENSING LIQUID CRYSTAL AND METHOD FOR CONTROLLING LIQUID CRYSTAL DROPPING AMOUNT

(75) Inventors: Hyug-Jin Kweon, Kyoungsangbuk-do (KR); Hae-Joon Son, Pusan (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/134,722

(22) Filed: Apr. 30, 2002

(30) Foreign Application Priority Data

Feb. 27, 2002 (KR) .................................. 2002-0010616

(51) Int. Cl.⁷ ................................................ B05D 5/00
(52) U.S. Cl. ...................... 427/256; 118/665; 118/688; 118/695; 118/712; 118/713; 222/1; 222/4; 222/20; 222/52; 222/481; 222/501; 222/507; 222/512; 222/544; 222/630; 427/421
(58) Field of Search ................................ 118/665, 688, 118/695, 712, 713; 222/1, 4, 20, 52, 481, 501, 507, 512, 544, 630; 427/256, 421

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. ............ 29/592 R |
| 4,653,864 A | 3/1987 | Baron et al. |
| 4,691,995 A | 9/1987 | Yamazaki et al. ....... 350/331 R |
| 4,775,225 A | 10/1988 | Tsuboyama et al. |
| 5,247,377 A | 9/1993 | Omeis et al. ................. 359/76 |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |

(List continued on next page.)

FOREIGN PATENT DOCUMENTS

| | | |
|---|---|---|
| EP | 1 003 066 A1 | 5/2000 |
| JP | 51-65656 | 6/1976 |
| JP | 52-149725 | 12/1977 |
| JP | 57-38414 | 3/1982 |
| JP | 57-88428 | 6/1982 |

(List continued on next page.)

Primary Examiner—Bernard Pianalto
(74) Attorney, Agent, or Firm—Morgan, Lewis & Bockius LLP

(57) ABSTRACT

A liquid crystal dispensing apparatus and a method of controlling a liquid crystal dropping amount are provided to drop liquid crystal onto a substrate corresponding to at least one unit panel area. In one aspect, the apparatus uses a liquid crystal dispensing unit to dispense liquid crystal. The liquid crystal dispensing unit includes a nozzle having a discharging hole through which the liquid crystal is dropped onto the substrate, a needle moveable between a down position in which the needle blocks the discharging hole and an up position in which the needle is separated from the discharging hole, a spring member to bias the needle toward the down position, and a solenoid coil to provide a magnetic force to move the needle to the up position. The dropping amount liquid crystal dispensing unit may be electrically controlled by controlling the solenoid coil or by controlling a gas pressure used to drive the liquid crystal through the discharging hole. Variations and errors in the dropping amount may also be compensated by an automated compensation of the electric power to the solenoid and/or the gas pressure.

40 Claims, 10 Drawing Sheets

U.S. PATENT DOCUMENTS

| | | | |
|---|---|---|---|
| 5,507,323 A | 4/1996 | Abe | |
| 5,511,591 A | 4/1996 | Abe | 141/7 |
| 5,539,545 A | 7/1996 | Shimizu et al. | |
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | Von Gutfeld et al. | 349/187 |
| 6,163,357 A | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,414,733 B1 | 7/2002 | Ishikawa et al. | 349/110 |
| 2001/0021000 A1 | 9/2001 | Egami | 349/187 |

FOREIGN PATENT DOCUMENTS

| | | |
|---|---|---|
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 A | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |

| | | | | | |
|---|---|---|---|---|---|
| JP | 2001-356353 A | 12/2001 | JP | 2002-107740 | 4/2002 |
| JP | 2001-356354 | 12/2001 | JP | 2002-122872 | 4/2002 |
| JP | 2002-14360 | 1/2002 | JP | 2002-122873 | 4/2002 |
| JP | 2002-23176 | 1/2002 | JP | 2002-139734 | 5/2002 |
| JP | 2002-49045 | 2/2002 | JP | 2002-202512 | 7/2002 |
| JP | 2002-82340 | 3/2002 | JP | 2002-202514 | 7/2002 |
| JP | 2002-90759 | 3/2002 | JP | 2002-214626 | 7/2002 |
| JP | 2002-90760 | 3/2002 | KR | 2000-0035302 A | 6/2000 |

APPARATUS FOR DISPENSING LIQUID CRYSTAL AND METHOD FOR CONTROLLING LIQUID CRYSTAL DROPPING AMOUNT

The present application claims the benefit of Korean Patent Application No. 10616/2002 filed in Korea on Feb. 27, 2002, which is hereby incorporated by reference.

BACKGROUND OF THE INVENTION

1. Field of the Invention

The present invention relates to an apparatus and method for dropping a controlled amount of liquid crystal, and more particularly, to an apparatus and method for dropping a controlled amount of liquid crystal such that an exact and optimal amount of liquid crystal is dispensed onto a substrate for a liquid crystal unit panel.

2. Description of the Related Art

Recently, various portable electric devices such as mobile phones, personal digital assistants (PDA), and notebook computers have been developed, and therefore, the needs for a flat panel display device used in small, light weight, and power-efficient devices for such portable devices have correspondingly increased. To meet such needs, flat panel display device technologies such as liquid crystal display (LCD) technology, plasma display panel (PDP) technology, field emission display (FED) technology, and vacuum fluorescent display (VFD) technology have been actively researched. Of these flat panel display devices, the LCD is highlighted due to current mass production, efficient driving schemes, and superior image quality.

The LCD is a device for displaying information on a screen using refractive anisotropy of liquid crystal. As shown in FIG. 1, the LCD 1 comprises a lower substrate 5, an upper substrate 3, and a liquid crystal layer 7 formed between the lower substrate 5 and the upper substrate 3. The lower substrate 5 is a driving device array substrate. A plurality of pixels (not shown) are formed on the lower substrate 5, and a driving device such as a thin film transistor (TFT) is formed on each pixel. The upper substrate 3 is a color filter substrate, and a color filter layer for reproducing real color is formed thereon. Further, a pixel electrode and a common electrode are formed on the lower substrate 5 and the upper substrate 3, respectively. An alignment layer is formed on the lower substrate 5 and the upper substrate 3 to align liquid crystal molecules of the liquid crystal layer 7 uniformly.

The lower substrate 5 and the upper substrate 3 are attached by a sealing material 9, and the liquid crystal layer 7 is formed therebetween. In addition, the liquid crystal molecules are reoriented by the driving device formed on the lower substrate 5 to control the amount of light transmitted through the liquid crystal layer, thereby displaying information.

Fabrication processes for a LCD device can be divided into a driving device array substrate process for forming the driving device on the lower substrate 5, a color filter substrate process for forming the color filter on the upper substrate 3, and a cell process. These processes will be described with reference to FIG. 2 as follows.

At first, a plurality of gate lines and data lines are arranged on the lower substrate to define a pixel area by the driving device array process and the thin film transistor connected to the both gate line and the data line is formed on the each pixel area (S101). Also, a pixel electrode, which is connected to the thin film transistor to drive the liquid crystal layer according to a signal applied through the thin film transistor, is formed by the driving device array process.

At the same time, R (Red), G (Green), and B (Blue) color filter layers for reproducing the color and a common electrode are formed on the upper substrate 3 by the color filter process (S104).

In addition, the alignment layer is formed on the lower substrate 5 and the upper substrate 3, respectively. Then, the alignment layer is rubbed to induce a surface anchoring (that is, a pretilt angle and alignment direction) to the liquid crystal molecules of the liquid crystal layer between the lower substrate 5 and the upper substrate 3 (S102 and S105). Thereafter, a spacer for maintaining the cell gap constant and uniform is dispersed on the lower substrate 5. Then, the sealing material is applied on an outer portion of the upper substrate 3 to attach the lower substrate 5 to the upper substrate 3 by compression (S103, S106, and S107).

The lower substrate 5 and the upper substrate 3 are made from a glass substrate of larger area. That is, the large glass substrate includes a plurality of unit panel areas in which the driving device such as TFT and the color filter layer are formed on. To fabricate the individual liquid crystal unit panel, the assembled glass substrate should be cut into unit panels (S108). Thereafter, the liquid crystal is injected into the empty individual liquid crystal unit panel through a liquid crystal injection opening (S109). The liquid crystal unit panel filled with the liquid crystal is completed by sealing the liquid crystal injection opening, and each liquid crystal unit panel is inspected (S110).

As described above, liquid crystal is injected through the liquid crystal injection opening. At that time, the injection of the liquid crystal is induced by pressure difference. FIG. 3 shows a device for injecting the liquid crystal into the liquid crystal panel. As shown in FIG. 3, a container 12 in which the liquid crystal is contained is placed in a vacuum chamber 10, and the liquid crystal panel is located on an upper portion of the container 12. The vacuum chamber 10 is connected to a vacuum pump to maintain a vacuum state. Further, a liquid crystal panel moving device (not shown) is installed in the vacuum chamber 10 to move the liquid crystal panel from the upper part of the container 12 to the surface of the liquid crystal to contact an injection opening 16 of the liquid crystal panel 1 with the liquid crystal 14 (this step is called a liquid crystal dipping injection step).

When the vacuum in the chamber 10 is released by introducing nitrogen gas ($N_2$) into the vacuum chamber 10 so that the injection opening of the liquid crystal panel 1 contacts the liquid crystal, liquid crystal 14 is injected into the panel through the injection opening by the pressure difference between the pressure in the liquid crystal panel and the pressure of the vacuum chamber. After the liquid crystal is entirely filled into the panel 1, the injection opening 16 is sealed by a sealing material to seal the liquid crystal layer (this step is called a liquid crystal vacuum injection step).

However, there are several problems in the liquid crystal dipping injection/vacuum injection method as follows.

First, the time needed to inject the liquid crystal into the panel 1 is increased. Generally, a gap thickness between the driving device array substrate and the color filter substrate in the liquid crystal panel is very narrow as order of magnitude of micrometers, and therefore, a very small amount of liquid crystal is injected into the liquid crystal panel per unit time. For example, it takes about 8 hours to inject the liquid crystal completely in fabrication process of the 15 inches-liquid crystal panel 15. Thus, the liquid crystal fabrication process time is increased due to the liquid crystal injection of long time, thereby reducing fabricating efficiency.

Second, the liquid crystal consumption is increased in the above liquid crystal injection method. A small amount of liquid crystal of the liquid crystal contained in the container 12 is injected into the liquid crystal panel 1. However, when the liquid crystal is exposed to atmosphere or to a certain gas, the liquid crystal is contaminated by reaction with the gas. Therefore, the remaining liquid crystal should be discarded after the injection when the liquid crystal 14 contained in the container 12 is injected into a plurality of liquid crystal panels 1, thereby increasing the liquid crystal panel fabrication cost.

SUMMARY OF THE INVENTION

Accordingly, the present invention is directed to an apparatus for dispensing liquid crystal and a method for controlling a liquid crystal dropping amount that substantially obviate one or more of the problems due to limitations and disadvantages of the related art.

An object of the present invention is to provide an apparatus for dropping liquid crystal that dispenses liquid crystal directly onto a glass substrate of larger area corresponding to at least one liquid crystal unit panel area.

Another object of the present invention is to provide an apparatus for dropping liquid crystal and a method for controlling a liquid crystal dropping amount such that a precisely con trolled amount of liquid crystal is automatically dropped.

Still another object of the present invention is to provide an apparatus and a method for compensating an amount of the liquid crystal dropped such that an exact and optimal amount of liquid crystal can be dropped onto a substrate of at least one liquid crystal unit panel area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal dispensing apparatus for dropping liquid crystal onto a substrate corresponding to at least one unit panel area comprises a liquid crystal dispensing unit to dispense liquid crystal, the liquid crystal dispensing unit including a nozzle having a discharging hole through which the liquid crystal is dropped onto the substrate, a needle moveable between a down position in which the needle blocks the discharging hole and an up position in which the needle is separated from the discharging hole, a spring member to bias the needle toward the down position, and a solenoid coil to provide a magnetic force to move the needle to the up position; an electric power supply unit to provide electric power to the solenoid coil to move the needle to the up position; a gas supply unit to provide a gas pressure to the liquid crystal dispensing unit to drive the liquid crystal through the discharging hole when the needle is in the up position; and a control unit to calculate a dropping amount of the liquid crystal to be dropped on the substrate and to control the electric power supply unit and the gas supply unit such that the calculated dropping amount of the liquid crystal is dispensed onto the substrate.

In another aspect, a method of dispensing a liquid crystal onto a substrate having at least one liquid crystal unit panel area from a liquid crystal dispenser using a gas pressure to dispense liquid crystal therefrom, the liquid crystal dispenser including a nozzle having a discharging opening from which the liquid crystal is dropped, a needle moveable between a down position to block the discharging opening and an up position to open the discharging opening, a spring to bias the needle toward the down position, and a solenoid coil to provide a magnetic force to open the discharging hole comprises the steps of inputting data; calculating a total dropping amount of the liquid crystal to be dropped onto the substrate according to the input data; calculating a dropping position at which liquid crystal is to be dropped onto the substrate according to the calculated total dropping amount; calculating a single dropping amount of the liquid crystal according to the total dropping amount; calculating an amount of electric power to be supplied to the solenoid coil and a gas pressure to be applied onto the liquid crystal in the liquid crystal dispenser according to the calculated single dropping amount; and applying the calculated amount of the electric power to the solenoid coil and supplying the calculated gas pressure to the liquid crystal dispenser.

In another aspect, a liquid crystal dispensing apparatus for dropping liquid crystal onto a substrate comprises a liquid crystal dispensing unit to dispense liquid crystal; a measuring system to measure an amount of liquid crystal dispensed from the dispensing unit; and a controller to receive the measured amount of liquid crystal from the measuring system, the controller comparing the measured amount of liquid crystal with a target amount of liquid crystal to be dispensed and electrically adjusting at least one dispensing characteristic of the liquid crystal dispensing unit if the measured amount is different than the target amount.

In another aspect, a liquid crystal dispensing apparatus for dropping liquid crystal onto a substrate corresponding to at least one unit panel area comprises a liquid crystal dispensing unit to dispense liquid crystal such that the liquid crystal dispensing unit includes a nozzle having a discharging hole through which the liquid crystal is dropped onto the substrate, a needle moveable between a down position in which the needle blocks the discharging hole and an up position in which the needle is separated from the discharging hole, a spring member to bias the needle toward the down position, and a solenoid coil to provide a magnetic force to move the needle to the up position; a dropping amount measuring unit to measure a dropping amount of liquid crystal dropped; a compensating amount calculation unit to compare the measured dropping amount with a target dropping amount to calculate a compensating value; and a compensating control unit to control at least one of the electric power applied to the solenoid coil and the gas pressure according to the compensating value.

In another aspect, a method of dispensing liquid crystal onto a substrate corresponding to at least one unit panel area comprises the steps of filling a liquid crystal dispensing unit with liquid crystal; dispensing a first quantity of liquid crystal onto the substrate; conducting an automated compensation of at least one dispensing characteristic of the liquid crystal dispensing unit; and dispensing a second quantity of liquid crystal onto the substrate, the second quantity being determined according to the automated compensation.

In another aspect, a method of dispensing a liquid crystal from a liquid crystal dispenser using a gas pressure to dispense liquid crystal therefrom, the liquid crystal dispenser including a nozzle having a discharging opening from which the liquid crystal is dropped, a needle moveable between a down position to block the discharging opening and an up position to open the discharging opening, a spring to bias the needle toward the down position, and a solenoid coil to provide a magnetic force to open the discharging hole comprises the steps of setting a dropping amount of the liquid crystal to be dropped; measuring an amount of liquid crystal dropped; calculating a compensating amount by comparing the set dropping amount with the measured dropping amount; and controlling at least one of an electric power applied to the solenoid coil and the gas pressure applied to the liquid crystal according to the calculated compensating amount.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In order to solve the problems of the conventional liquid crystal injection methods such as a liquid crystal dipping method or liquid crystal vacuum injection method, a liquid crystal dropping method has been introduced recently. The liquid crystal dropping method is a method for forming a liquid crystal layer by directly dropping the liquid crystal onto the substrates and spreading the dropped liquid crystal over the entire panel by pressing together the substrates during the assembling procedure of the substrates rather than by injecting the liquid crystal into the empty unit panel by the pressure difference between the inner and outer sides of the panel. According to the above liquid crystal dropping method, the liquid crystal is directly dropped onto the substrate in a short time period so that the liquid crystal layer in a LCD of larger area can be formed quickly. In addition, the liquid crystal consumption can be minimized due to the direct dropping of the liquid crystal as much as required amount, and therefore, the fabrication cost can be reduced.

Figure 4:
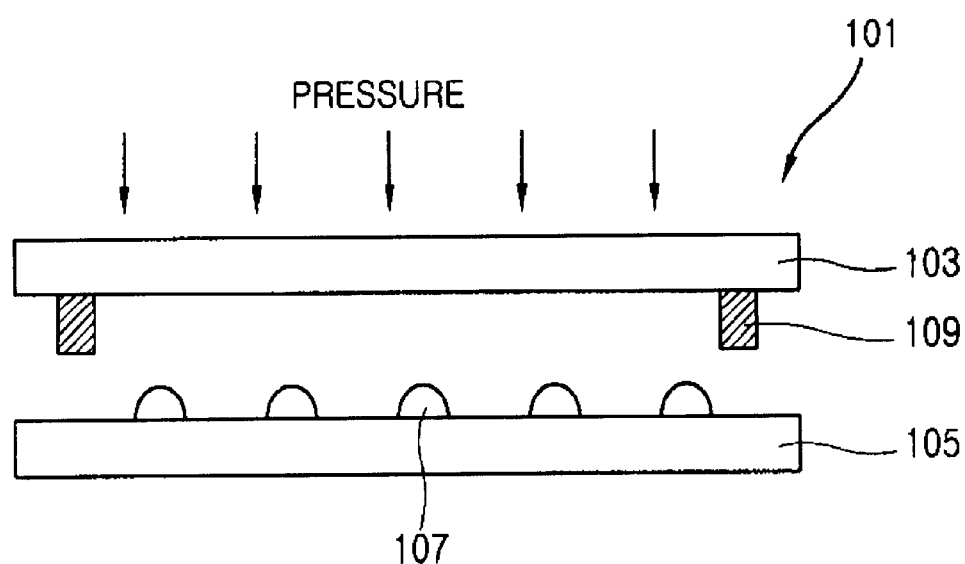
FIG. 4 is a view showing an exemplary LCD fabricated using a method for dropping liquid crystal according to the present invention.

FIG. 4 is a view showing the basic concept of the liquid crystal dropping method. As shown, in the liquid crystal dropping method, the liquid crystal is dropped onto a lower substrate 105 before assembling the lower substrate 105 and an upper substrate 103 having a driving device and a color filter respectively. Alternatively, the liquid crystal 107 may be dropped onto the substrate 103 on which the color filter is formed. That is, the liquid crystal 107 may be dropped either on a TFT (thin film transistor) substrate or on a CF (color filter) substrate. However, the substrate on which the liquid crystal 107 is dropped should preferably be located on lower part when the substrates 105 and 105 are assembled.

At that time, a sealing material 109 is applied on an outer part of the upper substrate 103, and therefore, the upper substrate 103 and the lower substrate 105 are attached as the upper substrate 103 and the lower substrate 105 are compressed. At the same time, the liquid crystal drop 107 is spread out due to the pressure, thereby forming a liquid crystal layer of uniform thickness between the upper substrate 103 and the lower substrate 105. That is, with the liquid crystal dropping method, the liquid crystal 107 is dropped onto the lower substrate 105 before the panel 101 is assembled, and subsequently the upper substrate 103 and the lower substrate 105 are attached by the sealing material 109.

Figure 5:
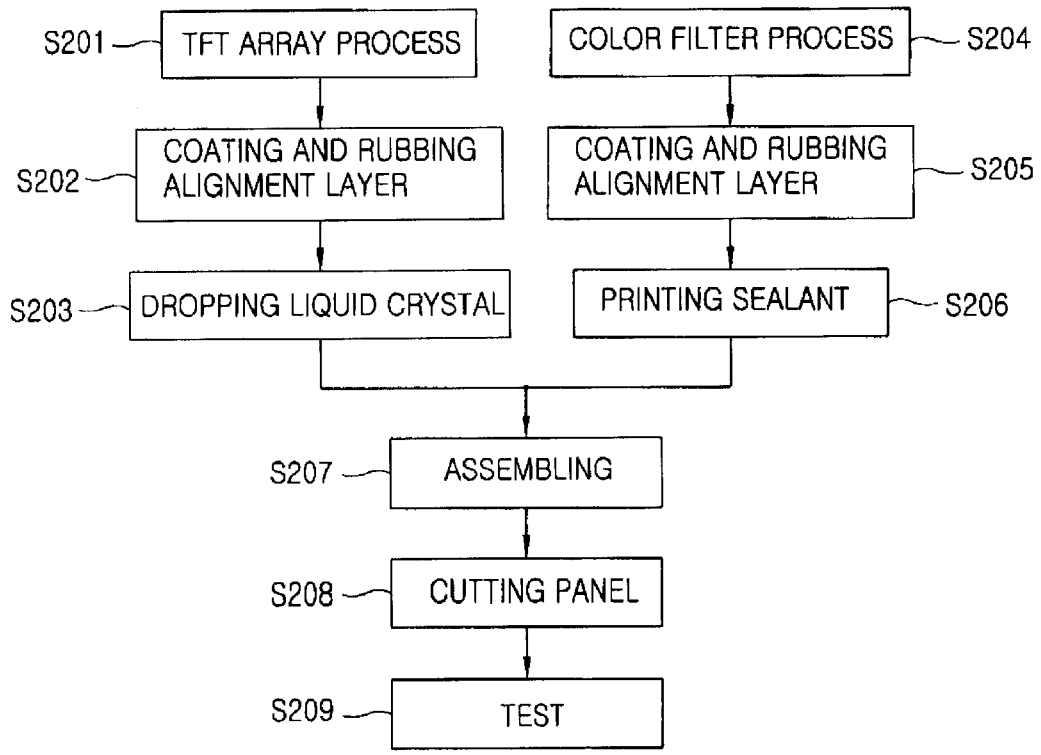
FIG. 5 is a flow chart showing an exemplary method for fabricating the LCD according to the liquid crystal dropping method.

FIG. 5 shows a method for fabricating the LCD by applying the above liquid crystal dropping method. As shown, the driving devices such as the TFT and the color filter layers are formed on the upper substrate and on the lower substrate with the TFT array process and the color filter process, respectively (S201 and S204). The TFT array process and the color filter process are generally similar to those of the conventional processes shown in FIG. 2. These processes are proceeded on the glass substrate having a plurality of the unit panel areas. By applying the liquid crystal dropping method to the manufacturing of the LCD, a glass substrate of large area (i.e. having an area of 1000×1200 $mm^2$ or more) can be used which is much larger than that of the conventional fabrication method.

On the lower and upper substrates on which the TFT and the color filter layer are respectively formed, the alignment layers are formed and rubbed (S202 and S205). The liquid crystal is dropped onto the liquid crystal unit panel areas of the lower substrate, and the sealing material is applied onto the outer portion areas of the liquid crystal unit panel areas on the upper substrate (S203 and S206).

Thereafter, the upper and lower substrates are disposed facing each other and compressed to attach to each other using the sealing material. By this compression, the liquid crystal drops spread out on the entire panel evenly (S207). By this process, a plurality of liquid crystal unit panel areas, on which the liquid crystal layers are formed, are formed on the assembled large glass substrates (i.e., the attached lower and upper substrates). Then, the assembled glass substrates are processed and cut into a plurality of liquid crystal unit panels (S208). The resultant liquid crystal unit panels are inspected, thereby finishing the LCD panel process (S208 and S209).

Figure 1:
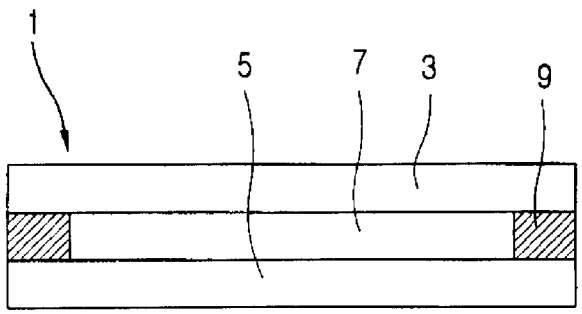
FIG. 1 is a cross-sectional view showing a general LCD.
Figure 2:
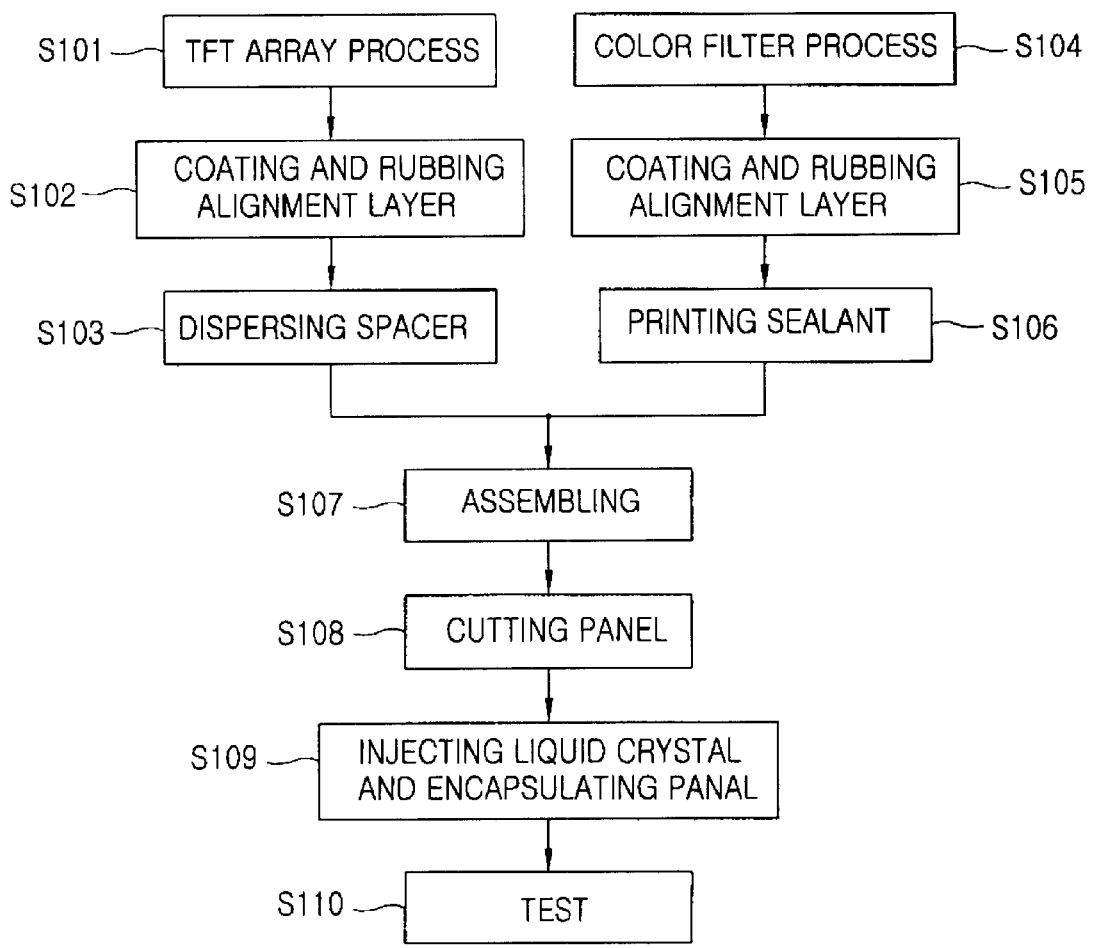
FIG. 2 is a flow chart showing a conventional method for fabricating the LCD.
Figure 3:
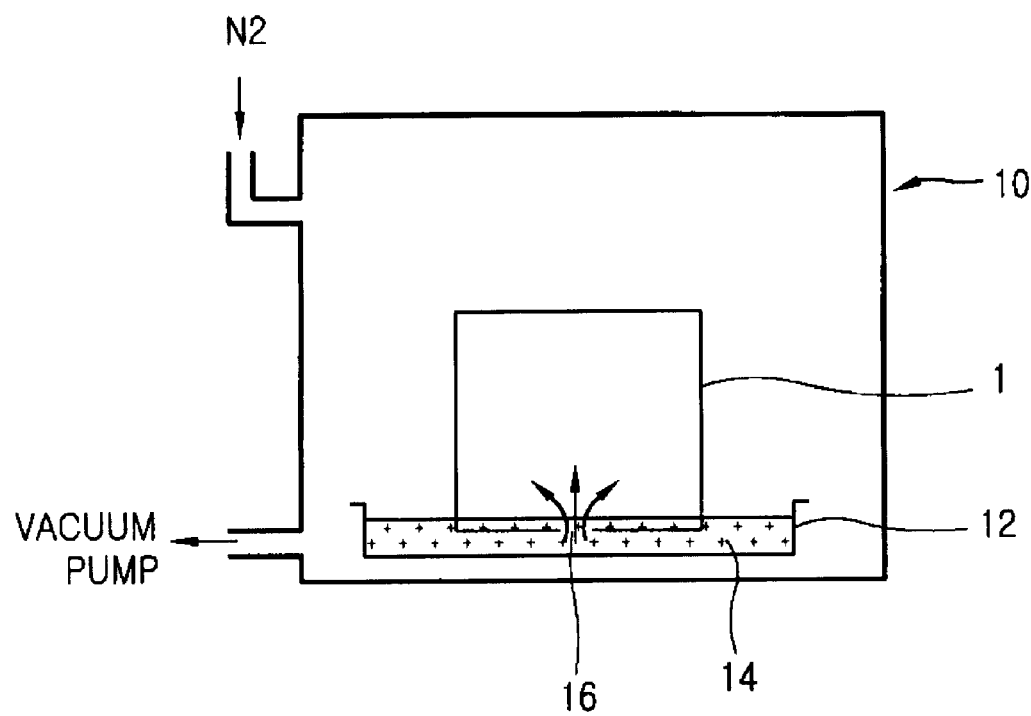
FIG. 3 is a view showing liquid crystal injection in the conventional method for fabricating the LCD.

The difference between the method for fabricating the LCD by applying the liquid crystal dispensing method shown in FIG. 5 and the method for fabricating the LCD by applying the conventional liquid crystal injection method shown in FIG. 2 will be described as follows. First, there is the difference between the dropping and injecting of the liquid crystal as well as the difference in the fabricating time of a larger area LCD. Moreover, in the injection method for fabricating the LCD of FIG. 2, the liquid crystal is injected through an injection opening and then the injection opening is sealed with a sealing material. However, with the dropping method of fabricating the LCD of FIG. 5, the liquid crystal is dropped directly onto the substrate so that the sealing process of an injection opening is not needed. In addition, in the injection method of FIG. 2, the panel is contacted with the liquid crystal contained in the container during the liquid crystal injection process, thereby contaminating the outer surface of the panel. Thus, a cleaning process of the substrate is necessary. However, with the liquid crystal dispensing method of FIG. 5, the liquid crystal is directly dropped onto the substrate. Therefore, the panel is not contaminated by the liquid crystal, and the cleaning process is not needed. Accordingly, the method for fabricating LCD by the liquid crystal dispensing method is simpler than that by the liquid injection method, thereby improving efficiency and yield.

In the method for fabricating LCD using the liquid crystal dispensing method, the dropping position of the liquid crystal and the dropping amount of the liquid crystal should be controlled to form the liquid crystal layer with a desired thickness. Since the thickness of the liquid crystal layer is closely related to the cell gap of the liquid crystal panel, the dropping position and the dropping amount of the liquid crystal should be carefully controlled to prevent defect in the resultant liquid crystal panel. Therefore, the present invention provides a dispensing apparatus for dropping specific amount of liquid crystal at a predetermined position.

Figure 6:
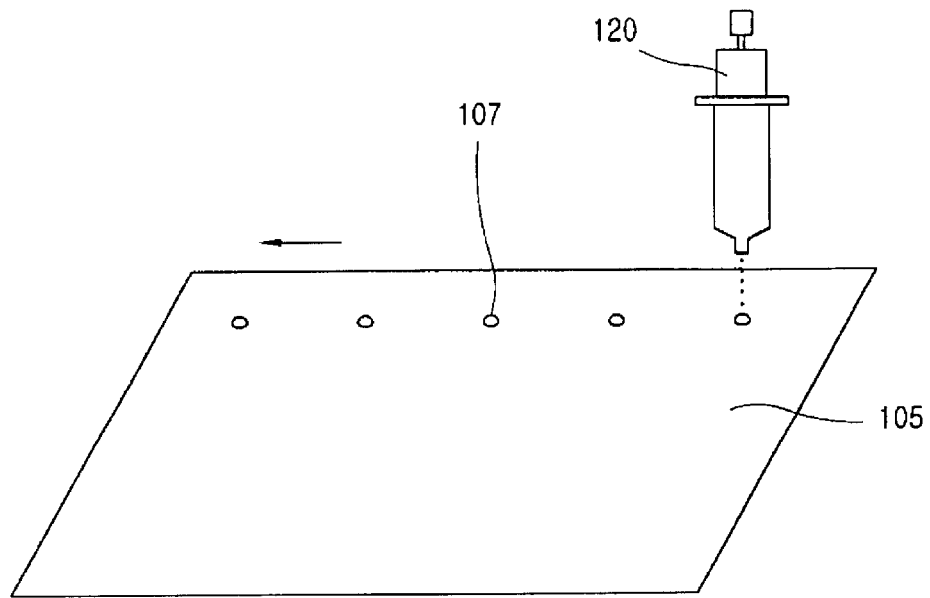
FIG. 6 is a view showing basic concept of the liquid crystal dropping method.

FIG. 6 shows a generalized arrangement for dropping the liquid crystal 107 onto the substrate 105 (glass substrate of larger area) using the liquid crystal dispensing apparatus 120 according to the present invention. As shown, the liquid crystal dispensing apparatus 120 is installed above the substrate 105. Although not shown in FIG. 6, liquid crystal 107 to be dropped onto the substrate 105 is contained in the liquid crystal dispensing apparatus 120.

Generally, the liquid crystal 107 is dropped onto the substrate 107 as drops. The substrate 105 moves in the x and y-directions at a predetermined speed while the liquid crystal dispensing apparatus 120 discharges the liquid crystal 107 at a predetermined time intervals. Therefore, the liquid crystal 107 dropping onto the substrate 105 is generally arranged along the x and y directions with predetermined intervals therebetween. Alternatively, the substrate 105 may be fixed, while the liquid crystal dispensing apparatus 120 is moved in the x and y directions to drop the liquid crystal 107 at predetermined time intervals. However, the liquid crystal drop shape may be trembled by the movement of the liquid crystal dispensing apparatus 120, so errors in the dropping position and the dropping amount of the liquid crystal 107 may occur. Therefore, it is preferable that the liquid crystal dispensing apparatus 120 be fixed and that the substrate 105 be moved.

Figure 7A:
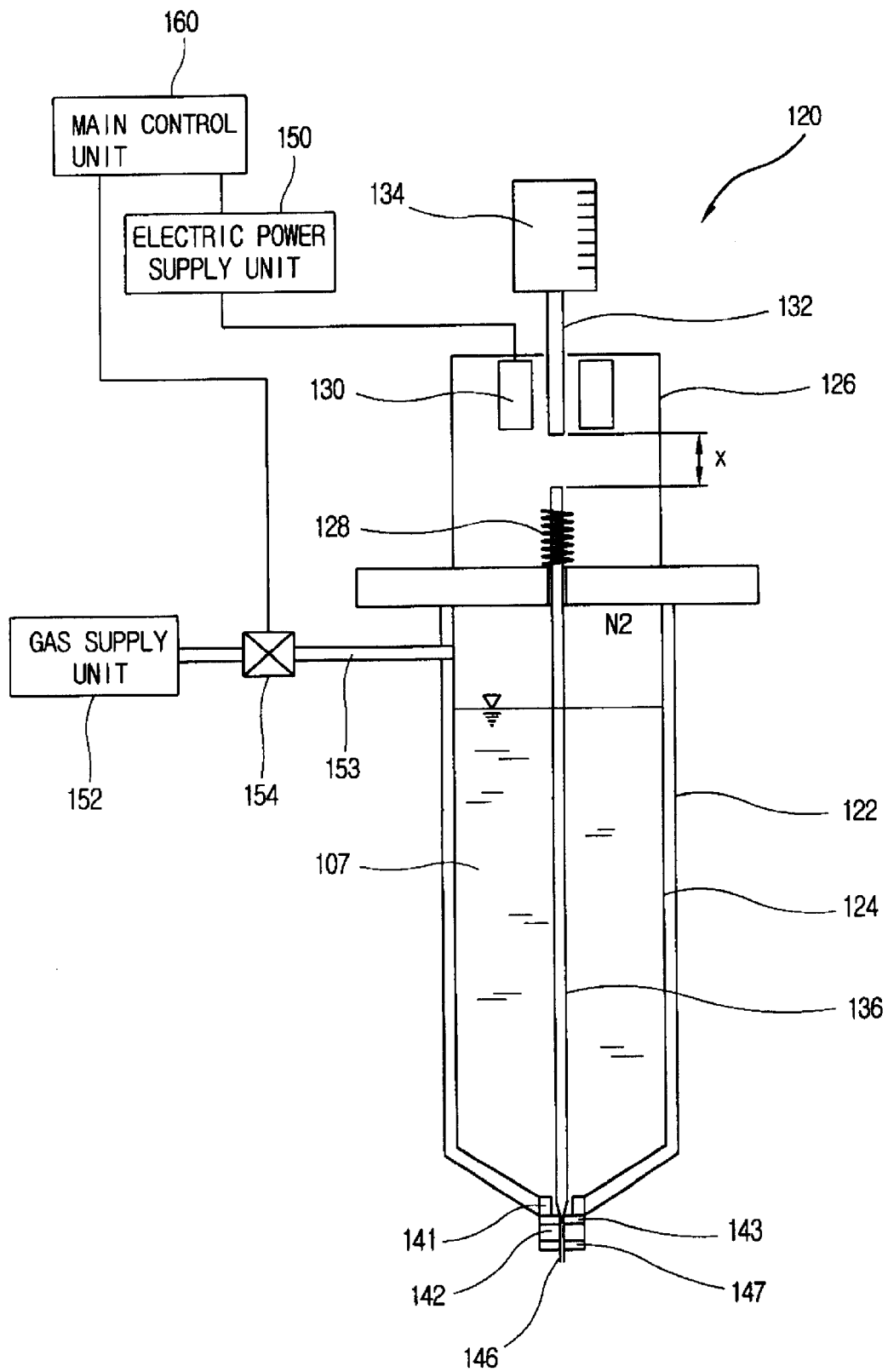
FIGS. 7A and 7B are cross-sectional views respectively showing an exemplary apparatus for dropping liquid crystal according to the present invention in a state in which the liquid crystal is not dispensed and a state in which the liquid crystal is dispensed.
Figure 7B:
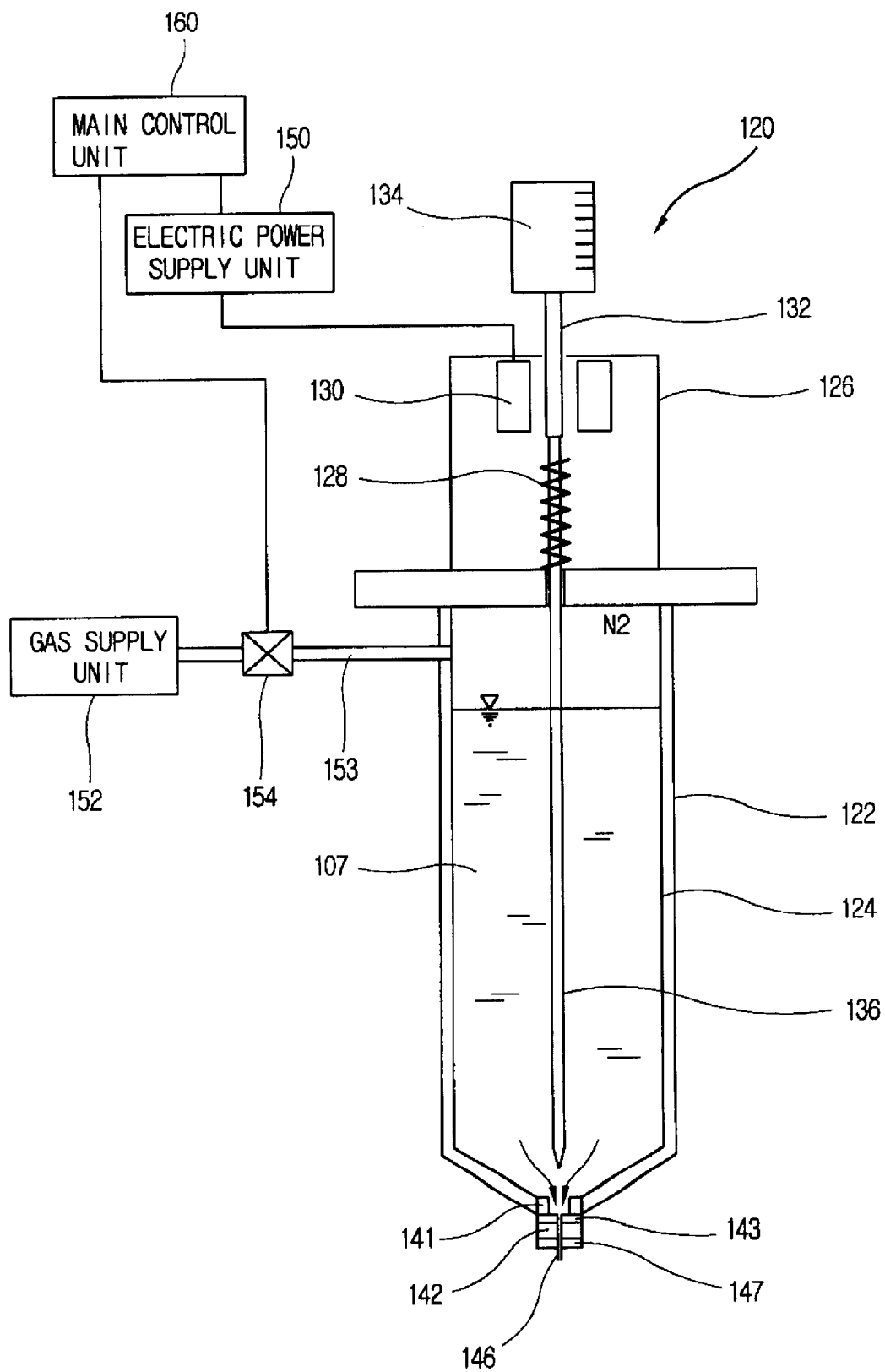
Figure 7C:
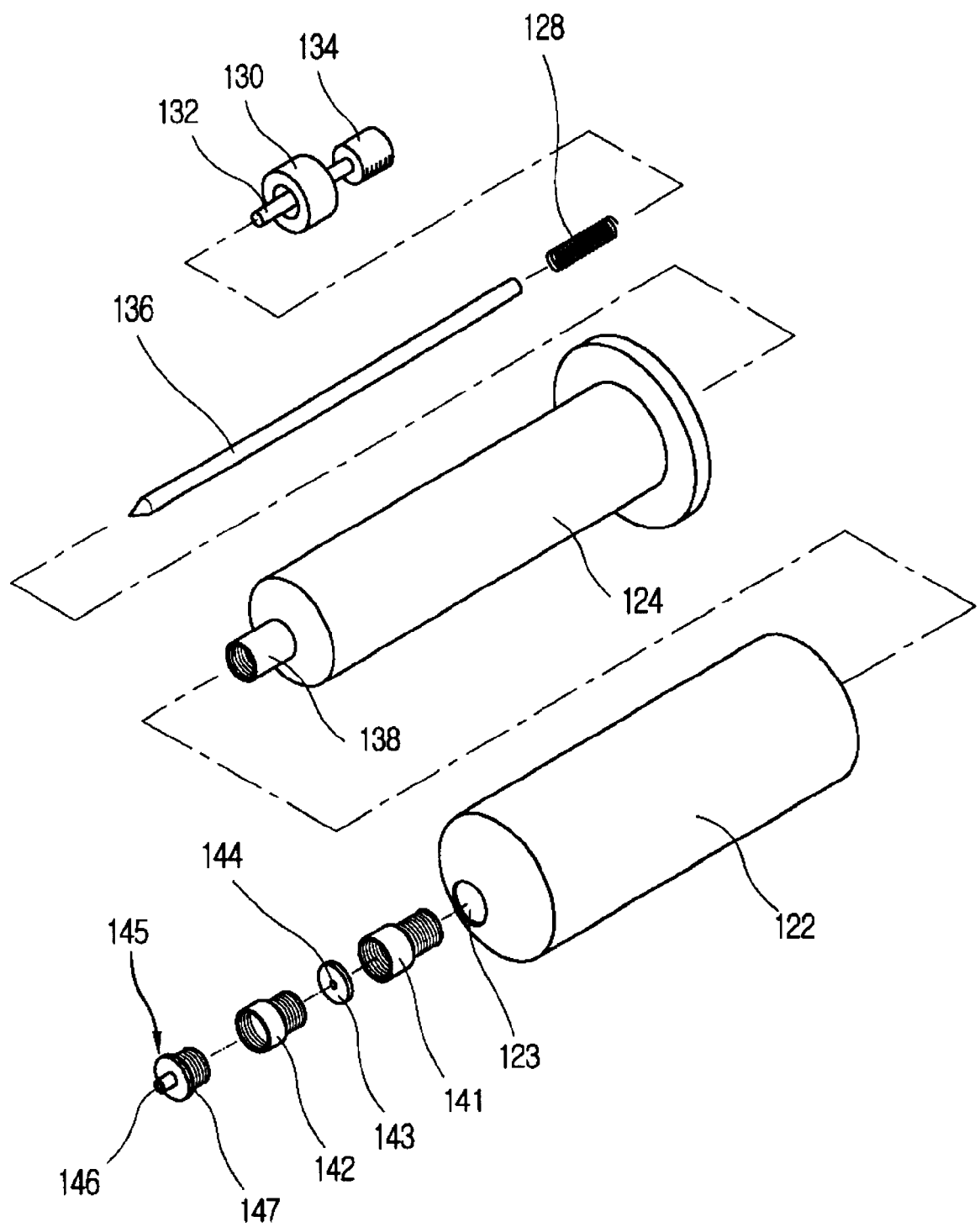
FIG. 7C is an exploded perspective view showing the apparatus of FIGS. 7A and 7B.

FIG. 7A is cross sectional view showing an exemplary liquid crystal dispensing apparatus when the liquid crystal is not dropped, FIG. 7B is a cross-sectional view showing the apparatus when the liquid crystal is dropped, and FIG. 7C is an exploded perspective view showing the apparatus. The liquid crystal dispensing apparatus 120 according to the present invention will be described in more detail with reference to drawings as follows.

As shown in FIGS. 7A–7C, a cylindrical liquid crystal container 124 is enclosed in a case 122 of the liquid crystal dispensing apparatus 120. The liquid crystal container 124 containing the liquid crystal 107 may be made of polyethylene. Further, the case 122 is made of a stainless steel to enclose the liquid crystal container 124 therein. Generally, because polyethylene has superior plasticity, it can be easily formed in the desired shape. Since polyethylene does not react with the liquid crystal 107 when the liquid crystal 107 is contained therein, polyethylene can be used for the liquid crystal container 124. However, polyethylene has a weak strength so that it can be easily distorted by external shocks or other stresses. For example, when polyethylene is used as the liquid crystal container 124, the container 124 may become distorted so that the liquid crystal 107 cannot be dropped at the exact position. Therefore, the container 124 should be enclosed in the case 122 made of the stainless steel or other material having greater strength. A gas supply tube 153 connected to an exterior gas supply unit 152 may be formed on an upper part of the liquid crystal container 124. An inert gas, such as nitrogen, is provided through the gas supply tube 153 from the gas supply unit 152 to fill the portion where the liquid crystal is not contained. Thus, the gas pressure compresses the liquid crystal 107 to be dispensed.

On the lower portion of the case 122, an opening 123 is formed. When the liquid crystal container 124 is enclosed in the case 122, a protrusion 138 formed on a lower end portion of the liquid crystal container 124 is inserted into the opening 123 so that the liquid crystal container 124 is connected to the case 122. Further, the protrusion 138 is connected to a first connecting portion 141. As shown, a nut (i.e., female threaded portion) is formed on the protrusion 138, and a bolt (i.e., male threaded portion) is formed on one side of the first connecting portion 141 so that the protrusion 138 and the first connecting portion 141 are interconnected by the nut and the bolt. Of course, it should be recognized that in this description and in the following description other connection types or configurations may be used.

A nut is formed on the other side of the first connecting portion 141 and a bolt is formed on one side of a second connection portion 142, so that the first connecting portion 141 and the second connecting portion 142 are interconnected. A needle sheet 143 is located between the first connecting portion 141 and the second connecting portion 142. The needle sheet 143 is inserted into the nut of the first connecting portion 141, and then the needle sheet 143 is combined between the first connecting portion 141 and the second connecting portion 142 when the bolt of the second connecting portion 142 is inserted and bolted. A discharging hole 144 is formed through the needle sheet 143, and the liquid crystal 107 contained in the liquid crystal container 124 is discharged through the discharging hole 144 passing through the second connecting portions 142.

A nozzle 145 is connected to the second connecting portion 142. The nozzle 145 is used to drop the liquid crystal 107 contained in the liquid crystal container 124 as much as a small amount. The nozzle 145 comprises a supporting portion 147 including a bolt connected to the nut at one end of the second connecting portion 142 to connect the nozzle 145 with the second connecting portion 142, a discharging opening 146 protruded from the supporting portion 147 to drop a small amount of liquid crystal onto the substrate as a drop.

A discharging tube extended from the discharging hole 144 of the needle sheet 143 is formed in the supporting portion 147, and the discharging tube is connected to the discharging opening 146. Generally, the discharging opening 146 of the nozzle 145 has very small diameter to finely control the liquid crystal dropping amount, and the discharging opening 146 protrudes from the supporting portion 147.

A needle 136 is inserted into the liquid crystal container 124, and one end part of the needle 136 is contacted with the needle sheet 143. Preferably, the end part of the needle 136 contacted with the needle sheet 143 is conically formed to be inserted into the discharging hole 144 of the needle sheet 143, thereby closing the discharging hole 144.

Further, a spring 128 is installed on the other end of the needle 136 located in an upper case 126 of the liquid crystal dispensing apparatus 120 to bias the needle 136 toward the needle sheet 143. A magnetic bar 132 and a gap controlling unit 134 are preferably connected above the needle 136. The magnetic bar 132 is made of magnetic material such as a ferromagnetic material or a soft magnetic material, and a solenoid coil 130 of cylindrical shape is installed on outer side of the magnetic bar 132 to be surrounded thereof. The solenoid coil 130 is connected to an electric power supplying unit 150 to supply electric power thereto, thereby generating a magnetic force on the magnetic bar 132 as the electric power is applied to the solenoid coil 130.

The needle 136 and the magnetic bar 132 are separated by a predetermined interval (x). When the electric power is applied to the solenoid coil 130 from the electric power supplying unit 150 to generate the magnetic force on the magnetic bar 132, the needle 136 contacts the magnetic bar 132 as a result of the generated magnetic force. When the electric power supplying is stopped, the needle 136 is returned to the original position by the elasticity of the spring 128. By the movement of the needle 136 in up-and-down directions, the discharging hole 144 formed on the needle sheet 143 is opened or closed. The end of the needle 136 and the needle sheet 143 repeatedly contact each other according to the supplying status of the electric power to the solenoid coil 130. Thus, the part of the needle 136 and the needle sheet 143 may be damaged by the repeated shock caused by the repeated contact. Therefore, it is desirable that the end part of the needle 136 and the needle sheet 143 are preferably formed by using a material which is strong to shock, for example, a hard metal to prevent the damage caused by the shock. Also, the needle 136 should be formed of a magnetic material in this exemplary configuration to be magnetically attracted to the magnetic bar 132.

As shown in FIG. 7B, as the discharging hole 144 of the needle sheet 143 is opened, the gas (nitrogen gas) supplied to the liquid crystal container 124 compresses the liquid crystal, thereby dropping liquid crystal 107 from the nozzle 145. At that time, the dropping amount of the liquid crystal 107 is dependant upon the opening time of the discharging hole 144 and the gas pressure applied onto the liquid crystal 107. The opening time is determined by the distance (x) between the needle 136 and the magnetic bar 132, the magnetic force of the magnetic bar 132 generated by the solenoid coil, and the tension of the spring 128 installed on the needle 136. The magnetic force of the magnetic bar 132 can be controlled according to the winding number of the solenoid coil 130 installed around the magnetic bar 132 or the magnitude of the electric power applied to the solenoid coil 130. Here, the distance x between the needle 136 and the magnetic bar 132 can be controlled by the gap controlling unit 134 installed on the end part of the magnetic bar 132.

The distance x between the needle 136 and the magnetic bar 132 as well as the tension of the spring 128 can be set by the operator. That is, the operator is able to directly set the distance x between the needle 136 and the magnetic bar 132 by operating the gap controlling unit 134, or the operator is able to set the tension of the spring 128 by operating a spring controlling means (not shown) to change the length of the spring 128.

In contrast, the amount of the electric power applied to the solenoid coil 130 or the amount of the nitrogen gas ($N_2$) supplied to the liquid crystal container 124 are controlled by the main control unit 160 through the power supply unit 150 and a flow control valve 154 installed on the gas supplying tube 153 supplying the gas into the liquid crystal container 124, respectively. That is, the amount of the electric power supply and the flow amount of the gas are not determined by the direct operation of the operator, but by the automated control of the main control unit 160. The amount of electric power supply and the flow amount of the gas are calculated according to input data.

Figure 8:
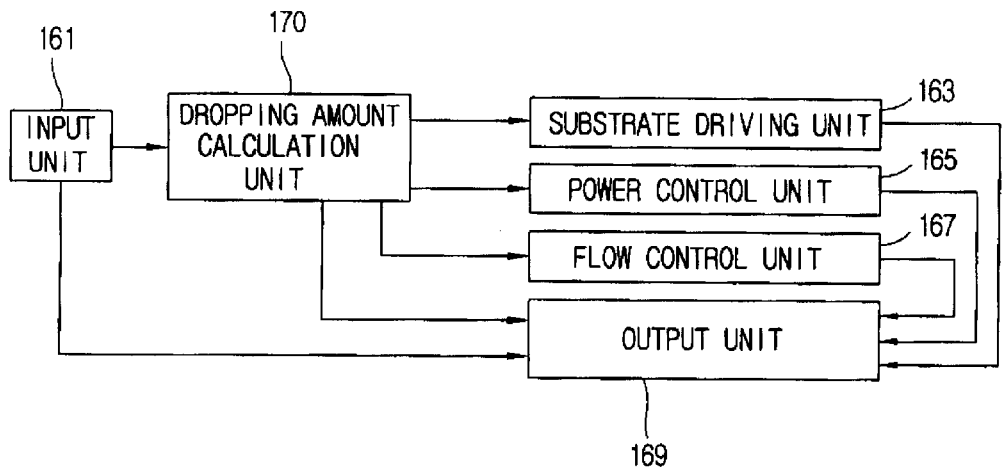
FIG. 8 is a block diagram showing an exemplary structure of a main control unit in the apparatus for dropping the liquid crystal according to the present invention.

As shown in FIG. 8, the main control unit 160 comprises a data input unit 161 for inputting various data such as the size of the liquid crystal unit panel to be fabricated, the number of liquid crystal panel areas included in the substrate, the cell gap of the liquid crystal panel (i.e., a height of a spacer), and information of the liquid crystal; a dropping amount calculation unit 170 for calculating the amount of liquid crystal to be dropped onto the substrate, the number of liquid crystal drops, a single drop amount of liquid crystal, and the dropping positions of the liquid crystal based on the input data and then outputting a signal; a substrate driving unit 163 for driving the substrate based on the dropping positions of the liquid crystal calculated by the dropping amount calculation unit 170; a power control unit 165 for supplying the electric power to the solenoid coil 130 by controlling the power supplying unit 150 based on the single dropping amount of the liquid crystal calculated by the dropping amount calculation unit 170; a flow control unit 167 for supplying the gas into the liquid crystal container 124 from the gas supplying unit 154 by controlling the flow control valve 154 based on the single dropping amount of the liquid crystal calculated by the dropping amount calculation unit 170; and an output unit 169 for outputting the inputted data, the calculated dropping amount and dropping positions, and current status of the liquid crystal dropping.

The input unit 161 inputs data using a general operating device such as a keyboard, a mouse, or a touch panel. The data such as the size of the liquid crystal unit panel to be fabricated, the size of the substrate, and the cell gap of the liquid crystal panel is input by the operator. The output unit 169 notifies the operator of various information. The output unit 169 includes a display device such as a cathode ray tube (CRT) or LCD and an output device such as a printer.

Figure 9:
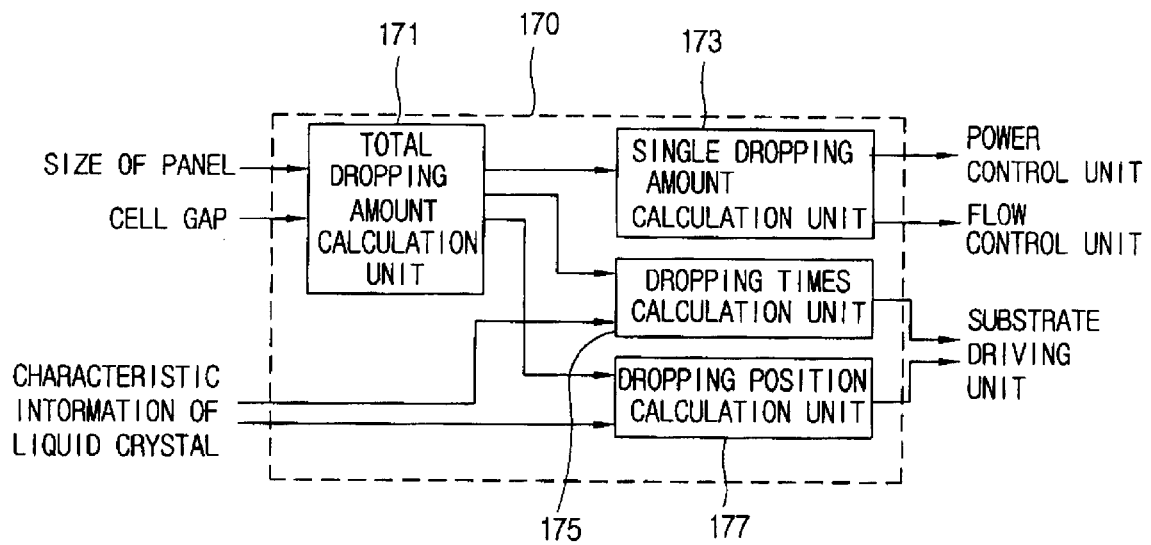
FIG. 9 is a block diagram showing an exemplary structure of a dropping amount calculation unit shown in FIG. 8.

The dropping amount calculation unit 170 calculates the total dropping amount of liquid crystal to be dropped onto the substrate having a plurality of liquid crystal unit panel areas, an amount of each dropping, the dropping positions of each liquid crystal drop and the dropping amount of the liquid crystal to be dropped on a particular liquid crystal unit panel area. As shown in FIG. 9, the dropping amount calculation unit 170 comprises a total dropping amount calculation unit 171 for calculating the total amount of the liquid crystal to be dropped on the liquid crystal unit panel area and the total amount of the liquid crystal to be dropped on the entire substrate having a plurality of liquid crystal unit panel areas based on the size of the liquid crystal unit panel and the cell gap input through the input unit 161; a dropping times calculation unit 175 for calculating the number of times the liquid crystal is dropped based on the total dropping amount data calculated by the total dropping amount calculation unit 171; a single dropping amount calculation unit 173 for calculating the single dropping amount of the liquid crystal dropped on a certain position of the substrate; and a dropping position calculation unit 177 for calculating the dropping positions on the substrate.

The total dropping amount calculation unit 171 calculates the dropping amount (Q) on the liquid crystal unit panel area according to the input size (d) of the unit panel and the cell gap (t) (Q=d×t) and calculates the total dropping amount of liquid crystal to be dropped on the substrate according to the number of the unit panel areas formed on the substrate.

The dropping times calculation unit 175 calculates the number of times the liquid crystal is dropped within the unit panel area based on the input total dropping amount, the size of the unit panel, and characteristics of the liquid crystal and the substrate. Generally, in the dropping method, the liquid crystal to be dropped on the substrate spreads out on the substrate by the pressure generated when the upper and lower substrates are attached. The spreading of the liquid crystal depends on characteristics of the liquid crystal such as the viscosity of the liquid crystal and the structure of the substrate on which the liquid crystal will be dropped, for example, the distribution of the pattern. Therefore, the spreading area of the liquid crystal which is dropped once is determined by these factors. Thus, the number of drops of the liquid crystal that should be dropped is determined by considering the above spreading area. Also, the number of drops on the entire substrate is calculated from the number of drops on the respective unit panels.

Further, the single dropping amount calculation unit 173 calculates the single dropping amount of the liquid crystal based on the inputted total dropping amount. As shown in FIG. 9, the dropping times calculation unit 175 and the single dropping amount calculation unit 173 are preferably formed separately to calculate the dropping times and the single dropping amount based on the inputted total dropping amount. However, the dropping times calculation unit 175 and the single dropping amount calculation unit 173 are related closely to each other, and the dropping times and the single dropping amount are correlated. In other words, the single dropping amount should be determined according to the dropping times.

The dropping position calculation unit 177 calculates the positions at which the liquid crystal will be dropped by calculating the area where the dropped liquid crystal spreads out based on the dropping amount and the characteristics of the liquid crystal.

The dropping times, the single dropping amount, and the dropping positions calculated as above are input into the substrate driving unit 163, the power control unit 165, and the flow control unit 167 of FIG. 8. The power control unit 165 of FIG. 8 calculates the electric power based on the inputted data (for example, dropping times and the single dropping amount), and then outputs a signal to the power supplying unit 150 to supply corresponding electric power to the solenoid coil 130. The flow control unit 167 calculates the flow amount of the gas based on the inputted data, and supplies the corresponding nitrogen gas ($N_2$) by controlling the flow control valve 154 of FIGS. 7A and 7B. Further, the substrate driving unit 163 outputs a substrate driving signal based on the calculated dropping position data to operate a substrate driving motor (not shown). Therefore, the substrate is moved to align the liquid crystal dispensing apparatus at the next dropping position on the substrate.

On the other hand, the output unit 169 displays the size of the liquid crystal unit panel, the cell gap, and the characteristic information of the liquid crystal which are input by the operator through the input unit 161. The output unit 169 also displays the dropping number, the single drop amount, and the dropping positions which are calculated based on the input data, and the present dropping status such as the times, position, and the amount of the liquid crystal at present. Thus, the operator can identify the above information.

As described above, in the liquid crystal dispensing apparatus, the dropping positions, the number of drops, and the single drop amount of the liquid crystal are calculated based on the data input by the operator, and subsequently, the liquid crystal is dropped on the substrate automatically. The liquid crystal dropping method using the above liquid crystal dispensing apparatus will be described as follows.

Figure 10:
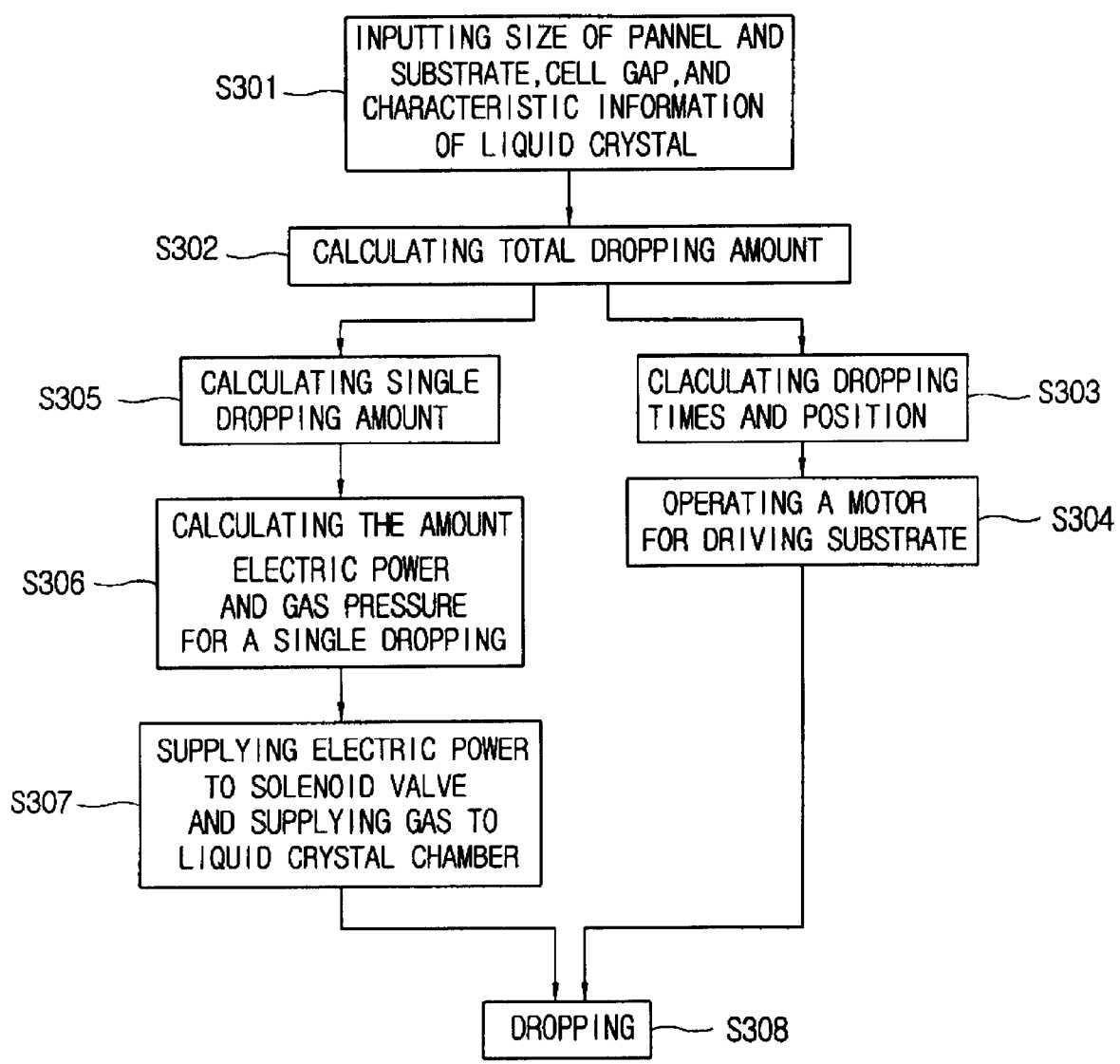
FIG. 10 is a block diagram showing an exemplary method for dropping the liquid crystal according to the present invention.

FIG. 10 is a flow chart showing an exemplary liquid crystal dropping method. As shown, when the operator inputs the size of the liquid crystal unit panel, cell gap, and the characteristic information of the liquid crystal through the input unit 161 by operating the keyboard, the mouse, or the touch panel (S301), the total dropping amount calculation unit 171 calculates the total dropping amount of the liquid crystal to be dropped on the substrate (or each unit panel area) (S302). Thereafter, the dropping time calculation unit 175, the single dropping amount calculation unit 173, and the dropping position calculation unit 177 calculate the dropping times, the dropping position, and the single dropping amount of the liquid crystal based on the calculated total dropping amount, respectively (S303 and S305).

The substrate, disposed beneath the liquid crystal dispensing apparatus 120, is moved along the x and y directions by a motor. The dropping position calculation unit 177 calculates the next position where the liquid crystal is dropped based on the input total dropping amount, the characteristic information of the liquid crystal, and the substrate information. The dropping position calculation unit then moves the substrate by operating the motor so that the liquid crystal dispensing apparatus 120 is located at the calculated dropping position (S304).

As described above, the power control unit 165 and the flow control unit 167 calculate the electric power amount and flow amount of the gas corresponding to the opening time of the discharging hole 144 for the single dropping amount based on the single dropping amount of the liquid crystal in the state that the liquid crystal dispensing apparatus 120 is located at the dropping position (S306). Subsequently, electric power is supplied to the solenoid coil 130 and the nitrogen gas ($N_2$) is supplied to the liquid crystal container 124 by controlling the power supply unit 150 and the flow control valve 154 to start the liquid crystal dropping at the calculated dropping position (S307 and S308).

As described above, the single dropping amount of the liquid crystal is determined by the amount of the electric power applied to the solenoid coil 130 and the amount of nitrogen gas ($N_2$) supplied to the liquid crystal container 124 to compress the liquid crystal. The liquid crystal dropping amount may be controlled by changing these two elements. Alternatively, the dropping amount may be controlled by fixing one element and changing another element. That is, the calculated amount of liquid crystal may be dropped on the substrate by fixing the flow amount of the nitrogen gas ($N_2$) supplied to the liquid crystal container 124 and by changing the amount of the electric power applied to the solenoid coil 130. In addition, the calculated amount of the liquid crystal may be dropped on the substrate by fixing the amount of the electric power applied to the solenoid coil 130 to be the calculated amount and by changing the flow amount of the nitrogen gas ($N_2$) supplied to the liquid crystal container 124.

Alternatively, the single drop amount of the liquid crystal dropped on the dropping position of the substrate can be determined by controlling the tension of the spring 128 or by controlling the distance x between the needle 136 and the magnetic bar 132. However, it is desirable that the tensile force of the spring 128 or the distance x are set in advance because the operator is able to control these two elements by a simple manual operation.

When the liquid crystal is dropped on the substrate, the dropping amount of the liquid crystal is very small amount, for example, in order of magnitude of milligrams. Therefore, it is very difficult to drop such fine amounts exactly, and such fine amounts can be changed easily by various facts. Therefore, in order to drop exact amount of the liquid crystal on the substrate, the dropping amount of the liquid crystal should be compensated. This compensation for the dropping amount of the liquid crystal may be achieved by a compensating control unit included in the main control unit 160 of FIG. 7A.

Figure 11:
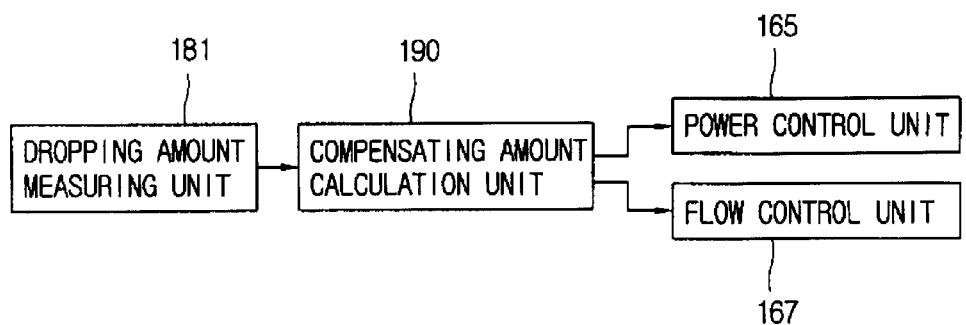
FIG. 11 is a block diagram showing an exemplary structure of the main control unit performing the compensation of single liquid crystal dropping amount.

As shown in FIG. 11, an exemplary compensating control unit comprises a dropping amount measuring unit 181 for measuring the amount of dropping liquid crystal and a compensating amount calculation unit 190 for comparing the measured dropping amount with the predetermined dropping amount to calculate compensating amount of the liquid crystal.

Although not shown, a balance for measuring the precise weight of the liquid crystal is installed on the liquid crystal dispensing apparatus (or on an outer part of the liquid crystal dispensing apparatus) to measure the weight of the liquid crystal at regular times or occasionally. Generally, the liquid crystal weighs only a few milligrams. Therefore, it is difficult to weigh a single liquid crystal drop exactly. Therefore, in the present invention, the amount of predetermined dropping times, for example, the liquid crystal amount of 10 drops, 50 drops, or 100 drops are preferably measured. Thus the single dropping amount of the liquid crystal can be determined.

Figure 12:
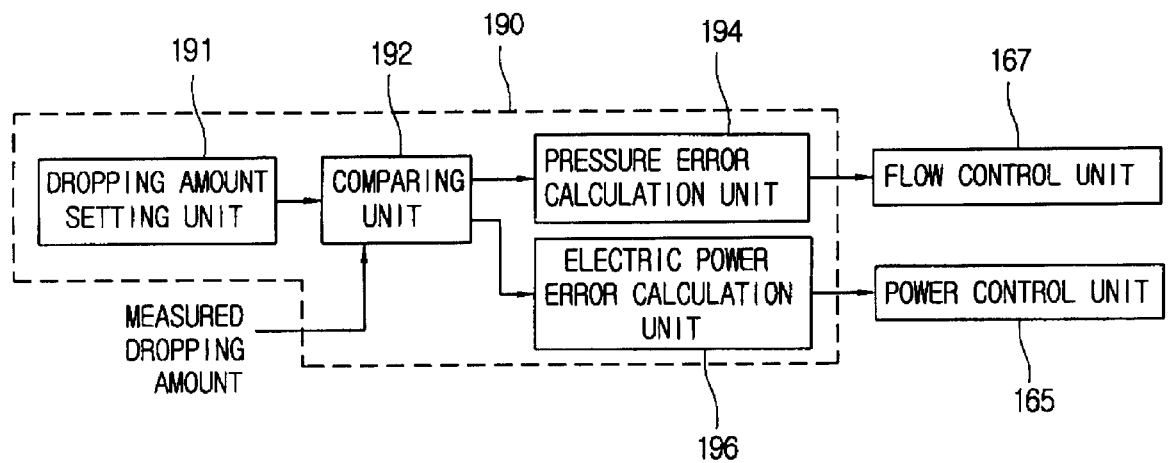
FIG. 12 is a block diagram showing an exemplary structure of a compensating amount control unit shown in FIG. 11.

As shown in FIG. 12, the compensating amount calculation unit 190 comprises a dropping amount setting unit 191 for setting the dropping amount calculated by the single dropping amount calculation unit 173 as a present dropping amount; a comparing unit 192 for comparing the set dropping amount with the dropping amount measured by the dropping amount measuring unit 181 and calculating a difference value between the amounts; a pressure error calculation unit 194 for calculating an error value of the pressure corresponding to the difference value of dropping amount calculated by the comparing unit 192; and an electric power error calculation unit 196 for calculating an error value of the electric power corresponding to the difference value of the dropping amount calculated in the comparing unit.

The pressure error calculation unit 194 outputs the error value of the pressure into the flow control unit 167. Then, the flow control unit 167 converts the error value into the supplying amount of the gas to outputs a controlling signal to the flow control valve 154 so as to increase or decrease the flow amount of the gas flowed into the liquid crystal container 124.

Further, the electric power error calculation unit 196 outputs the calculated error value of the electric power into the power control unit 165. Then, the power control unit 165 converts the inputted error value into the electric power amount to apply the increased or decreased electric power into the solenoid coil 130 so as to compensate the dropping amount of the liquid crystal.

Figure 13:
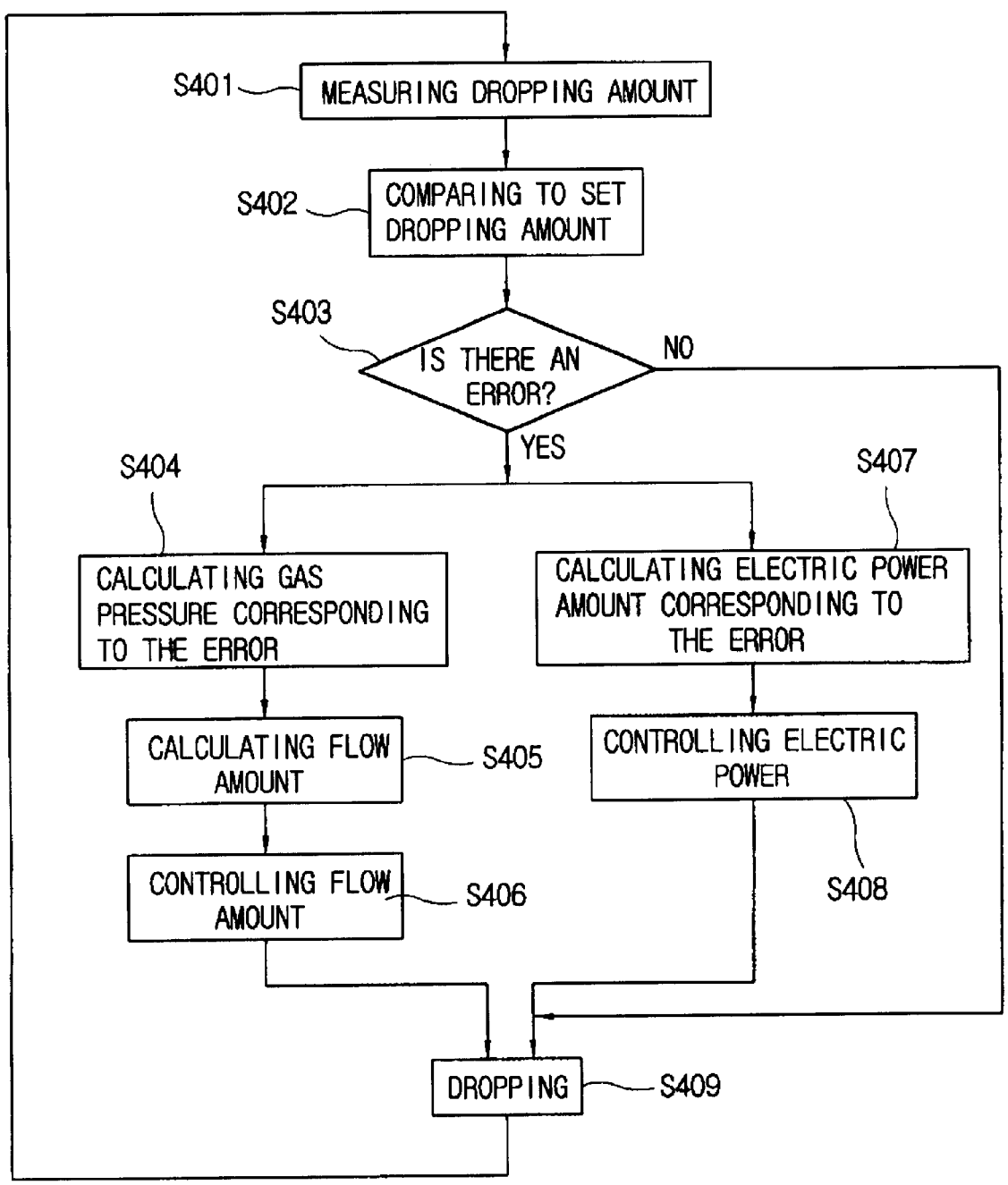
FIG. 13 is a flow chart showing an exemplary method for compensating the dropping amount of the liquid crystal according to the present invention.

FIG. 13 is a view showing an exemplary method for compensating the dropping amount of the liquid crystal. As shown, after the liquid crystal dropping of the predetermined number of times is completed, the dropping amount of the liquid crystal is measured using the balance (S401). Subsequently, the measured dropping amount is compared to the set dropping amount to determine whether or not there is an error in the dropping amount (S402 and S403).

If there is no error value, it means that the present dropping amount is same as the set dropping amount and the dropping process proceed. If there is an error value, the pressure error calculation unit 194 calculates the pressure of the nitrogen gas ($N_2$) corresponding to the error value (S404). Further, the flow control unit 167 calculates the flow amount of the nitrogen gas ($N_2$) which will be supplied to the liquid crystal container 124 based on the pressure corresponding to the error value (S405). Then, the flow control valve 154 is operated to supply the nitrogen gas ($N_2$) after increasing or decreasing to the above calculated amount from the originally calculated amount of the gas to the liquid crystal container 124, thereby compensating the amount of liquid crystal to be dropped on the substrate (S406 and S409).

Alternatively, or in addition, if there is an error in the dropping amount of the liquid crystal, the electric power error calculation unit 196 can calculate the electric power amount corresponding to the error, and applies an increased or decreased amount of electric power as compared to the calculated amount to the solenoid coil 130 by controlling the electric power supply unit 150. Accordingly, a compensated amount of liquid crystal can be dropped on the substrate (S407, S408, and S409).

The compensating processes described above may be repeated. For example, whenever a predetermined number of liquid crystal drops are completed, the compensating processes can be repeated to always drop the exact amount of the liquid crystal.

During the compensating process of the liquid crystal dropping amount, the dropping amount of the liquid crystal can be compensated by controlling the flow amount of the nitrogen supplied to the liquid crystal container 124 together with the electric power applied to the solenoid coil 130 mutually. However, the dropping amount of the liquid crystal can be compensated by fixing one element and controlling another element. Further, it is desirable that the tension of the spring 128 or the distance (x) are fixed at initially predetermined values.

As described above, according to the liquid crystal dispensing apparatus of the present invention, the position and the amount of liquid crystal dropping on the substrate are calculated by the inputted size of the unit panel area, the cell gap, and the characteristic information of the liquid crystal. Therefore, an exact amount of liquid crystal can always be dropped on the exact position. Also, according to the present invention, if the amount of dropping liquid crystal is different from the set dropping amount, the error can be automatically compensated. Thus, defective liquid crystal panels caused by errors in the dropping amount of the liquid crystal can be prevented.

As described above, according to the present invention providing the liquid crystal dispensing apparatus, the dropping amount of the liquid crystal to be dropped on the substrate is calculated automatically based on the size of the unit panel, the cell gap, and the characteristic information of the liquid crystal. Then, the liquid crystal is dropped as the predetermined amount on the substrate. In addition, if there is an error in the dropping amount of the liquid crystal after measuring the amount of dropping liquid crystal, the error value is compensated, thereby always maintaining an exact amount of the liquid crystal to be dropped on the substrate. According to the present invention, the dropping position, dropping times, and the dropping amount of the liquid crystal are automatically calculated based on the inputted data, and if there is an error after measuring the dropping amount, the error is compensated automatically.

While the above descriptions have been provided for the liquid crystal dispensing apparatus having a specified structure, the present invention is not limited to the above structure, but can be applied to all liquid crystal dispensing apparatus including the function of automatically calculating the dropping position, the dropping times, and the dropping amount and the function of automatic compensating. For example, a liquid crystal dispensing apparatus having the structure of U.S. Patent Application entitled "Liquid Crystal Dispensing Apparatus with Nozzle Protecting Device" filed Apr. 24, 2002 and/or U.S. Patent Application entitled "Liquid Crystal Dispensing Apparatus" filed Apr. 24, 2002, which are both hereby incorporated by reference.

It will be apparent to those skilled in the art that various modifications and variations can be made in the apparatus for dispensing liquid crystal and the method for controlling a liquid crystal dropping amount of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus for dropping liquid crystal onto a substrate corresponding to at least one unit panel area, the apparatus comprising:
   a liquid crystal dispensing unit to dispense liquid crystal, the liquid crystal dispensing unit including:
      a nozzle having a discharging hole through which the liquid crystal is dropped onto the substrate,
      a needle moveable between a down position in which the needle blocks the discharging hole and an up position in which the needle is separated from the discharging hole,
      a spring member to bias the needle toward the down position, and
      a solenoid coil to provide a magnetic force to move the needle to the up position;
   an electric power supply unit to provide electric power to the solenoid coil to move the needle to the up position;
   a gas supply unit to provide a gas pressure to the liquid crystal dispensing unit to drive the liquid crystal through the discharging hole when the needle is in the up position; and
   a control unit to calculate a dropping amount of the liquid crystal to be dropped on the substrate and to control the electric power supply unit and the gas supply unit such that the calculated dropping amount of the liquid crystal is dispensed onto the substrate.

2. The apparatus according to claim 1, wherein the control unit includes:
   an input unit through which data is input;
   a dropping amount calculation unit to calculate the dropping amount of the liquid crystal and a dropping position of the liquid crystal onto the substrate according to the input data;
   at least one of an electric power control unit control the electric power provided by the electric power supply unit to the solenoid coil according to the liquid crystal dropping amount calculated by the dropping amount calculation unit, and a flow control unit to control the gas pressure according to the liquid crystal dropping amount calculated by the dropping amount calculation unit; and
   a substrate driving unit to drive one of the substrate and the liquid crystal dispensing unit with respect to the other so that the nozzle is positioned above the dropping position calculated by the dropping amount calculation unit.

3. The apparatus according to claim 2, wherein the input data includes at least an area of the liquid crystal panel unit, a cell gap of the liquid crystal unit panel, and characteristic information of the liquid crystal.

4. The apparatus according to claim 2, wherein the control unit further includes an output unit to display the input data, the calculated dropping amount of the liquid crystal, and a dropping status of the liquid crystal.

5. The apparatus according to claim 2, wherein the dropping amount calculation unit includes:
   a total dropping amount calculation unit to calculate a total amount of the liquid crystal to be dropped onto the substrate according to the input data;
   a dropping position calculation unit to calculate a dropping position of the liquid crystal according to the total amount of liquid crystal to be dropped calculated by the total dropping amount calculation unit;
   a dropping number calculation unit to calculate a number of drops of the liquid crystal according to the total dropping amount calculated by total dropping amount calculation unit; and
   a single dropping amount calculation unit to calculate a single drop amount of the liquid crystal according to the total dropping amount calculated by the total dropping amount calculation unit.

6. The apparatus according to claim 1, further comprising a compensating unit to compensate the dropping amount of the liquid crystal when a measured dropping amount of the liquid crystal being dropped is different from the calculated dropping amount of the main control unit.

7. The apparatus according to claim 6, wherein the compensating unit includes:
   a dropping amount measuring unit to measure the measured dropping amount of the liquid crystal; and
   a compensating amount calculation unit to compare the measured dropping amount and the calculated dropping amount, to calculate a compensating amount, and to drive the at least one of the electric power control unit and the flow control unit.

8. The apparatus according to claim 7, wherein the compensating amount calculation unit includes:
   a dropping amount setting unit in which the dropping amount calculated in the main control unit is set;
   a comparing unit to compare the dropping amount set in the dropping amount setting unit with the measured dropping amount and to calculate a difference value; and
   a compensation calculation unit to calculate an error value of dispensing characteristic in order to compensate for the difference value calculated by the comparing unit.

9. The apparatus according to claim 8, wherein the compensation calculation unit includes at least one of:
   a pressure error calculation unit to calculate an error value of the gas pressure applied to the liquid crystal in the liquid crystal dispensing unit according to the difference value calculated in the comparing unit, to calculate the flow amount of the gas corresponding to the error value of the gas pressure, and to output the flow amount such that the gas pressure is compensated; and
   an electric power error calculation unit to calculate an error value of the electric power amount applied to the solenoid coil based on the difference value calculated in the comparing unit and to output the error value of the electric power amount such that the electric power provided to the solenoid coil is compensated.

10. A method of dispensing a liquid crystal onto a substrate having at least one liquid crystal unit panel area from a liquid crystal dispenser using a gas pressure to dispense liquid crystal therefrom, the liquid crystal dispenser including a nozzle having a discharging opening from which the liquid crystal is dropped, a needle moveable between a down position to block the discharging opening and an up position to open the discharging opening, a spring to bias the needle toward the down position, and a solenoid coil to provide a magnetic force to open the discharging hole, the method comprising the steps of:
   inputting data;
   calculating a total dropping amount of the liquid crystal to be dropped onto the substrate according to the input data;
   calculating a dropping position at which liquid crystal is to be dropped onto the substrate according to the calculated total dropping amount;
   calculating a single dropping amount of the liquid crystal according to the total dropping amount;
   calculating an amount of electric power to be supplied to the solenoid coil and a gas pressure to be applied onto the liquid crystal in the liquid crystal dispenser according to the calculated single dropping amount; and
   applying the calculated amount of the electric power to the solenoid coil and supplying the calculated gas pressure to the liquid crystal dispenser.

11. The method according to claim 10, wherein the step of inputting data includes inputting an area of the liquid crystal unit panel, a cell gap of the liquid crystal panel, and characteristic information of the liquid crystal.

12. The method according to claim 10, further comprising a step of controlling a tension of the spring.

13. The method according to claim 12, wherein the step of controlling the tension of the spring includes an operator setting the tension at an initial stage of the liquid crystal dropping.

14. The method according to claim 13, further comprising the step of displaying the input data, the calculated dropping amount of the liquid crystal, and a dropping status of the liquid crystal.

15. The method according to claim 10, wherein the step of compensating the dropping amount of the liquid crystal includes the steps of:
   measuring the measured amount the liquid crystal dropped; and
   calculating a compensating amount by comparing the measured dropping amount with the calculated single dropping amount; and
   controlling at least one of the electric power applied to the solenoid coil and the gas pressure according to the calculated compensating amount.

16. The method according to claim 15, wherein the gas pressure corresponding to a single dropping amount is fixed at an initial stage of the liquid crystal dropping.

17. The method according to claim 15, further comprising a step of compensating the dropping amount of the liquid crystal if a measured amount of the liquid crystal dropped on the substrate is different from the calculated single dropping amount.

18. The method according to claim 10, wherein the amount of electric power corresponding to a single dropping amount of the liquid crystal is fixed at an initial stage of the liquid crystal dropping.

19. A liquid crystal dispensing apparatus for dropping liquid crystal onto a substrate, comprising:
   a liquid crystal dispensing unit to dispense liquid crystal;
   a measuring system to measure an amount of liquid crystal dispensed from the dispensing unit; and
   a controller to receive the measured amount of liquid crystal from the measuring system, the controller comparing the measured amount of liquid crystal with a target amount of liquid crystal to be dispensed and electrically adjusting at least one dispensing characteristic of the liquid crystal dispensing unit if the measured amount is different than the target amount.

20. The apparatus according to claim 19, wherein the liquid crystal dispensing unit includes a nozzle having a discharging opening from which the liquid crystal is dropped, a needle moveable between a down position to block the discharging opening and an up position to open the discharging opening, a spring to bias the needle toward the down position, and a solenoid coil to provide a magnetic force to open the discharging hole.

21. The apparatus according to claim 20, wherein a gas pressure is used to drive the liquid crystal through the discharging opening when the needle is in the up position.

22. The apparatus according to claim 21, wherein the controller controls at least one of the gas pressure and the solenoid coil to adjust the at least one dispensing characteristic of the liquid crystal dispensing unit.

23. A liquid crystal dispensing apparatus for dropping liquid crystal onto a substrate corresponding to at least one unit panel area, the apparatus comprising:
   a liquid crystal dispensing unit to dispense liquid crystal, the liquid crystal dispensing unit including:
      a nozzle having a discharging hole through which the liquid crystal is dropped onto the substrate,
      a needle moveable between a down position in which the needle blocks the discharging hole and an up position in which the needle is separated from the discharging hole,
      a spring member to bias the needle toward the down position, and
      a solenoid coil to provide a magnetic force to move the needle to the up position;
   a dropping amount measuring unit to measure a dropping amount of liquid crystal dropped;

a compensating amount calculation unit to compare the measured dropping amount with a target dropping amount to calculate a compensating value; and a compensating control unit to control at least one of the electric power applied to the solenoid coil and the gas pressure according to the compensating value.

24. The apparatus according to claim 23, wherein the compensating control unit includes at least one of:

an electric power control unit to control the electric power applied to the solenoid coil according to the compensating amount calculated in the compensating amount calculation unit; and a flow control unit to control a gas pressure applied to the liquid crystal in the liquid crystal dispensing unit according to the compensating amount calculated in the compensating amount calculation unit.

25. The apparatus according to claim 23, wherein the dropping amount measuring unit includes a gravimeter adjacent to the substrate.

26. The apparatus according to claim 23, wherein the dropping amount measuring unit measures the dropping amount by measuring a total dropping amounts of set number of drops.

27. The apparatus according to claim 23, wherein the compensating amount calculation unit includes:

a dropping amount setting unit in which the target dropping amount is set;

a comparing unit to compare the dropping amount with the measured dropping amount and to calculate a difference value; and an electric power error calculation unit to calculate an error value of an electric power amount applied to the solenoid coil according to the difference value calculated in the comparing unit and to output the error value to control the electric power amount applied to the solenoid coil.

28. The apparatus according to claim 23, wherein the compensating amount calculation unit includes:

a dropping amount setting unit in which the target dropping amount is set;

a comparing unit to compare the dropping amount with the measured dropping amount and to calculate a difference value; and a pressure error calculation unit to calculate an error value of the gas pressure applied to the liquid crystal in the liquid crystal dispensing unit according to the difference value calculated in the comparing unit and to output the error value to control the gas pressure.

29. The apparatus according to claim 23, wherein the compensating amount calculation unit comprises:

a dropping amount setting unit in which the target dropping amount is set;

a comparing unit to compare the dropping amount with the measured dropping amount and to calculate a difference value;

a pressure error calculation unit to calculate an error value of the gas pressure applied to the liquid crystal in the liquid crystal dispensing unit according to the difference value calculated in the comparing unit and to output the error value of the gas pressure to control the gas pressure; and an electric power error calculation unit to calculate an error value of an electric power amount applied to the solenoid coil according to the difference value calculated in the comparing unit and to output the error value of the electric power amount to control the electric power amount applied to the solenoid coil.

30. A method of dispensing liquid crystal onto a substrate corresponding to at least one unit panel area, the method comprising the steps of:

filling a liquid crystal dispensing unit with liquid crystal;

dispensing a first quantity of liquid crystal onto the substrate;

conducting an automated compensation of at least one dispensing characteristic of the liquid crystal dispensing unit; and dispensing a second quantity of the liquid crystal onto the substrate, the second quantity being determined according to the automated compensation.

31. The method according to claim 30, wherein the step of conducting the automated compensation includes the steps of dispensing a test quantity of liquid crystal to a measuring system substantially adjacent to the substrate;

measuring the amount of liquid crystal dispensed in the test quantity;

comparing the measured amount with a target amount; and automatically adjusting the at least one dispensing characteristic of the liquid crystal dispensing unit.

32. The method according to claim 31, wherein the liquid crystal dispensing unit includes at least one of an electrically controlled valve structure to control the dispensing of the liquid crystal and an electrically controlled gas supply to apply a gas pressure in order to drive the dispensing of the liquid crystal when the electrically controlled valve structure is open, and wherein the step of automatically adjusting the dispensing characteristics includes the step of electrically adjusting at least one of the electrically controlled valve structure and electrically controlled the gas supply.

33. The method according to claim 32, wherein the electrically controlled valve structure includes a nozzle having discharging hole and a needle moveable between a first position to close the discharging hole and a second position to open the discharging hole.

34. A method of dispensing a liquid crystal from a liquid crystal dispenser using a gas pressure to dispense liquid crystal therefrom, the liquid crystal dispenser including a nozzle having a discharging opening from which the liquid crystal is dropped, a needle moveable between a down position to block the discharging opening and an up position to open the discharging opening, a spring to bias the needle toward the down position, and a solenoid coil to provide a magnetic force to open the discharging hole, the method comprising the steps of:

setting a dropping amount of the liquid crystal to be dropped;

measuring an amount of liquid crystal dropped;

calculating a compensating amount by comparing the set dropping amount with the measured dropping amount; and controlling at least one of an electric power applied to the solenoid coil and the gas pressure applied to the liquid crystal according to the calculated compensating amount.

35. The method according to claim 34, wherein the dropping amount of the liquid crystal is calculated according to an area of a liquid crystal unit panel, a cell gap of the liquid crystal unit panel, and characteristic information of the liquid crystal.

36. The method according to claim 34, wherein the step of measuring the amount of liquid crystal dropped includes the step of measuring a weight of the liquid crystal dropped.

37. The method according to claim 34, wherein the step of calculating the compensating amount includes the steps of:

calculating a difference value by comparing the set dropping amount with the measured dropping amount;

calculating an error value of the gas pressure applied to the liquid crystal in the liquid crystal dispensing unit according to the calculated difference value in the dropping amount; and calculating a gas flow amount corresponding the calculated error value.

38. The method according to claim 34, wherein the step of calculating the compensating amount includes the steps of:

calculating a difference value by comparing the set dropping amount with the measured dropping amount;

calculating an error amount of the electric power applied to the solenoid coil according to the difference value; and calculating an electric power corresponding to the calculated error value.

39. The method according to claim 34, wherein the step of calculating the compensating amount includes the steps of:

calculating a difference value by comparing the set dropping amount with the measured dropping amount;

calculating an error value of the gas pressure applied to the liquid crystal in the liquid crystal dispensing unit according to the calculated difference value in the dropping amount to determine a gas flow amount corresponding the calculated error value of the gas pressure; and calculating an error amount of the electric power applied to the solenoid coil according to the difference value to determine an electric power corresponding to the calculated error value.

40. The method according to claim 34, further comprising the step of controlling a tensile force of the spring in accordance with the calculated compensating amount.

* * * * *